United States Patent [19]
Weichart et al.

[11] Patent Number: 5,404,340
[45] Date of Patent: Apr. 4, 1995

[54] MARINE SEISMIC STREAMER WITH A DEVICE FOR DAMPING OSCILLATIONS

[75] Inventors: Helmut Weichart, Hanover; Manfred Technau, Laatzen; Andreas Laake, Hanover, all of Germany

[73] Assignee: Prakla-Seismos GmbH, Hanover, Germany

[21] Appl. No.: 31,431

[22] Filed: Mar. 15, 1993

[30] Foreign Application Priority Data

Mar. 14, 1993 [DE] Germany ............... 42 08 178.5

[51] Int. Cl.⁶ .................... G01V 1/38; H04B 17/00
[52] U.S. Cl. .................... 367/20; 174/101.5; 367/162; 367/166
[58] Field of Search ............ 367/15, 20, 106, 162, 367/166, 171, 177, 165, 173; 181/110; 174/101.5

[56] References Cited

U.S. PATENT DOCUMENTS

| | | | |
|---|---|---|---|
| 2,465,696 | 3/1949 | Paslay | 367/15 |
| 4,477,887 | 10/1984 | Berni | 367/20 |
| 4,500,980 | 2/1985 | Copeland | 367/154 |
| 4,660,183 | 4/1987 | McGowan et al. | 367/15 |
| 4,736,345 | 4/1988 | Keckler et al. | 367/20 |
| 4,955,012 | 9/1990 | Bledsoe et al. | 367/20 |
| 5,251,182 | 10/1993 | Carpenter | 174/101.5 |
| 5,274,603 | 12/1993 | Zibilich et al. | 174/101.5 |

FOREIGN PATENT DOCUMENTS

| | | | |
|---|---|---|---|
| 0171936 | 2/1986 | European Pat. Off. | |
| 2941028 | 4/1981 | Germany | |
| 2145226 | 3/1985 | United Kingdom | 367/20 |

OTHER PUBLICATIONS

Lithan Resources Systems, Alvin, Tex.; LRS-500 Streamer Cables, 8 pgs., 1981.

*Primary Examiner*—Nelson Moskowitz
*Attorney, Agent, or Firm*—Walter C. Farley

[57] ABSTRACT

The invention relates to a marine-seismic streamer having a liquid-filled tube (4) in which there are arranged, in the longitudinal direction, hauling cables and flow-obstructing devices including shaped pieces (2) which are spaced apart in the longitudinal direction for dividing the streamer into sections, and hydrophones (5). The shaped pieces (2) are of cylindrical construction with an outside diameter smaller than the inside diameter of the tube (4) such that an annular gap (9) is formed between the tube (4) and each shaped piece (2). The shaped pieces (2) have at least one annular seal (10), the outer diameter of the annular seal (10) corresponding to the inside diameter of the tube (4).

13 Claims, 2 Drawing Sheets

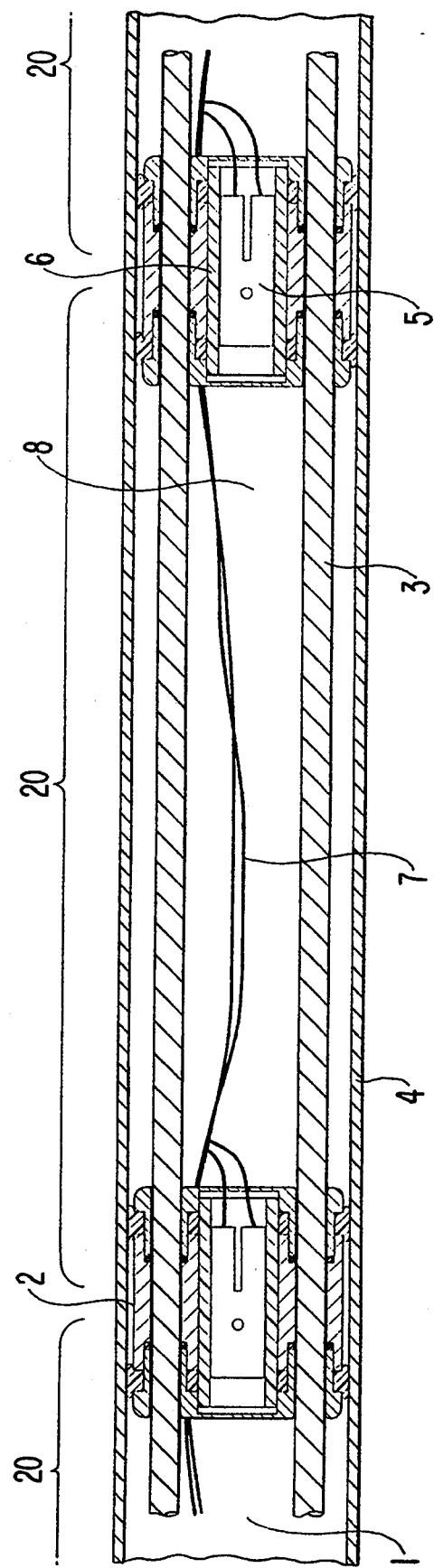

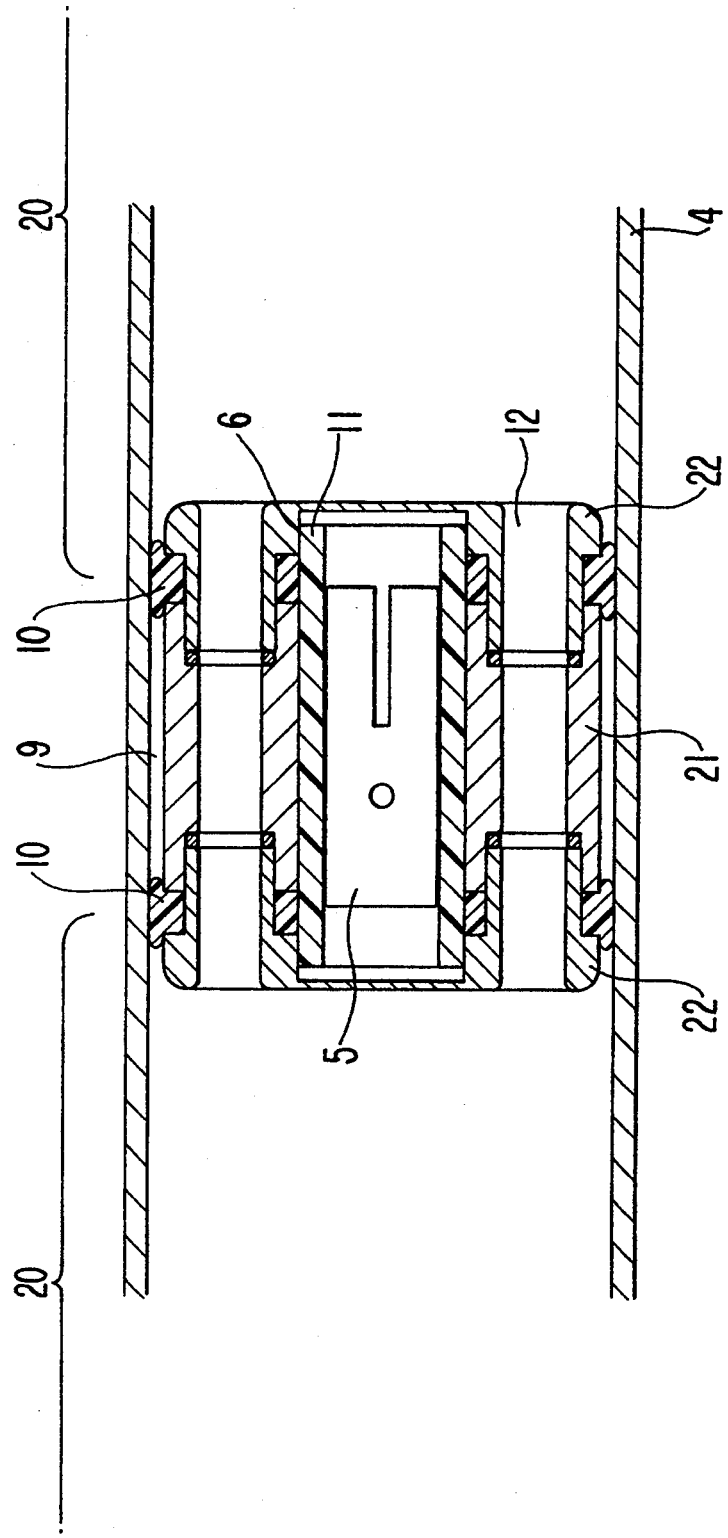

MARINE SEISMIC STREAMER WITH A DEVICE FOR DAMPING OSCILLATIONS

FIELD OF THE INVENTION

This invention relates to a marine-seismic streamer including a liquid-filled tube and means for supporting hydrophones, and means for reducing vibrations or oscillations arising from other than seismic sources.

BACKGROUND OF THE INVENTION

In marine-seismic investigations, seismic signals are generated, for example, by air pulse generators or blasting charges dragged behind a measuring ship. Sea measuring cables, called streamers, serve for receiving sound signals in the body of water. Measuring cells which react to pressure changes, called hydrophones, are arranged in each streamer and the measuring cells register the seismic reflection signals from the lower sea floor.

Streamers of this type are usually dragged by the measuring ship, the measuring cable generally consisting of a plurality of sections which are connected mechanically and electrically by quick-fitting couplings. The overall length of a streamer can be several kilometers. The tensile force acting on the streamer is transmitted from one quick-fitting coupling to the next quick-fitting coupling by hauling cables such as steel cables. Shaped pieces which are spaced apart in the longitudinal direction are provided to maintain the spacing of the hauling cables and to provide for transverse stability of the streamer. This arrangement forms a skeleton structure which absorbs the forces acting on the streamer. The skeleton structure is drawn into a tube for protection against sea water. To facilitate this assembly, the shaped pieces have an outside diameter which is slightly smaller than the inside diameter of the tube.

Arranged between the shaped pieces are the hydrophones whose wiring is passed through bores in the shaped pieces. In order to adapt the density of the streamer to the density of the sea water, the streamer is filled with liquid, in particular oil.

A continuous column of liquid in the tube is required so that the tube can be filled with liquid.

The shaped pieces have an annular gap from the streamer tube and generally a bore of large passage width arranged in the longitudinal direction so that the oil filling in the streamer can flow freely to a great extent. In this case, however, it is disadvantageous that the oil can move in a substantially unobstructed manner in each individual streamer section, even during the measuring run. In the event of longitudinal vibrations of the streamer during a measuring run arising, for example, from resonances caused by the rotational speed of the ship's shaft or vibrations of sea waves, the column of oil enclosed in the streamer is thereby moved relative to the skeleton structure. At the ends of the column of oil, for example at the couplings of the individual streamer sections, the undisturbed pressure prevailing at the site of the receiver is alternately increased and reduced. This relative movement is converted into pressure waves. The pressure waves are acoustic interference signals which falsify or are superimposed on the useful seismic signals.

A marine-seismic streamer having a liquid-filled tube is known from EP 171,936, in which, in the longitudinal direction, hauling cables, shaped pieces which are spaced apart in the longitudinal direction, and hydrophones as well as flow-obstructing openings in the shaped parts are provided for dividing the streamer into sections.

The size of the openings used allows only very slow pressure compensation between the sections. Since the outside diameter of the shaped pieces corresponds to the inside diameter of the tube, the tube is constricted under tensile force between each pair of successive shaped pieces, resulting in an undulating outer shape of the tube overall in operation.

DE 2,941,028 A1 shows a streamer having an additional inside tube in which hydrophones are received via an anchorage in open-pore foamed material holders. The inside tube itself is centered in the outside tube via spacers. The construction of this streamer is very complex, in particular when considering the arrangement of the wiring of the hydrophones which are passed in each case into the outside tube through the wall of the inside tube. Exchanging hydrophones is therefore only possible at unacceptable expense.

Additionally, due to the use of two coaxial tubes, differential vibrations occur which can only be eliminated by complex measures.

SUMMARY OF THE INVENTION

It is therefore the object of the invention, in a marine-seismic streamer, to reduce the interference signals induced by flow movement of the liquid filling of the streamer in a simple manner without resulting in interferences to the structure of the streamer.

According to the invention, the shaped pieces of cylindrical construction have a smaller diameter than the inside diameter of the tube. The flow-obstructing devices, constructed, in particular, as shaped pieces, are provided with annular seals whose outer diameter corresponds to the inside diameter of the tube. A flow obstructing sealing of the annular space between the shaped piece and the tube is thus achieved. Due to the annular gap being kept open to a limited extent and due to the partial permeability of the device, only compensation flows of the streamer liquid having long periodic cycles can take place. Filling, emptying and changing the oil in the streamer thus remains possible. Under severe tensile loading, the diameter of the tube is reduced to the extent that the width of the gap approaches zero and the effect of the flow obstruction is thus increased further.

Flow-obstructing devices can advantageously be constructed in such a way that the shaped pieces are formed in three parts from a central part and two identical head parts. Symmetrical construction of the shaped piece allows cost-effective manufacture and assembly. In shaped pieces of this type, the annular seals are arranged between the central part and the head parts.

Advantageously, the seals are clamped between the components such that the seals are fixed on the shaped piece when the skeleton structure, consisting of shaped pieces and hauling cables, is drawn into the tube. For shaped pieces of integral construction, provision is made alternatively for the annular seals to be arranged in outer annular grooves on the shaped piece.

In a two-part shaped piece, the seal is inserted between the two parts.

The hydrophone is protected from mechanical damage in particular when it is arranged inside a shaped piece.

If the hydrophone is inserted in a through-bore of the shaped piece, arranged in the longitudinal direction, preferably with a sleeve-type seal, the hydrophone is held in a defined position. It cannot move either in the radial or in the axial direction relative to the tube of the streamer. Interference signals caused by vibrations of the hydrophone relative to the shaped piece or tube can thus be avoided on the hydrophone.

Due to the fact that the sleeve-type and/or the annular seals are formed from open-cell, preferably elastic, material, in particular polyurethane (PU) foam, such that through channels of reduced opening cross-section remain in the longitudinal direction of the streamer, the hydrophone is acoustically isolated from the shaped piece serving as the holder. The vibrations produced during dragging of the streamer through the water are therefore not transmitted to the hydrophone by the tube or the shaped pieces connected via hauling cables. When a PU-foam is used, the sound frequency range used for marine-seismic investigations is advantageously effectively isolated.

If the modulus of elasticity of the tube is selected to be such that, under tensile force during a measuring run of the streamer, the inside diameter of the tube substantially corresponds to the outer diameter of the shaped pieces, the streamer is of substantially sealing construction between the shaped piece and the tube during a measuring run. In order to allow only a slight reduction of the gap, provision can be made for linear elevations or ribs running in the longitudinal direction of the tube to be provided on the cylindrical surface of the shaped pieces, the height of which elevations corresponds to the width of the gap in the state of rest of the tube. Under loading, said elevations are then pressed into the material of the tube and increase the holding force of the shaped pieces in the axial direction even if there is still a gap. When using a shaped piece with a through-bore in which a hydrophone with a sleeve type seal, preferably made from PU-foam, is inserted, the streamer liquid can flow through this seal with obstructed flow during the measuring run. It is advantageous that a free annular gap remain between the shaped piece and the tube in the state of rest, such that filling, emptying or changing the oil can be carried out on the streamer at the customary speed.

In another embodiment it is possible for the shaped pieces themselves to be formed from open-cell, solid material, preferably polypropylene or polyamide. A damped compensation flow through the shaped piece itself is thus possible. The seals to be provided between the shaped piece and the tube and between the shaped piece and the hydrophone then no longer need to be of permeable design.

If the annular seals are constructed as O-rings or lip seals with through-openings such that the through-openings allow damped liquid flow, cost-effective standard sealing rings can be used. The shapes and dimensions of the through-openings to be made, which can be small bores, can be selected depending on the required damping.

Alternative arrangements are also particularly advantageous. If each shaped piece of the streamer has hydrophones and flow obstructing devices, a maximum effect damping the vibration of the column of liquid can be achieved. All the hydrophones are arranged so as to be positionally stable and protected. Alternatively, shaped pieces, following on from one another in a regular or irregular manner, can be arranged in the streamer with and without seals and hydrophones. The irregular arrangement forms isolated columns of liquid of different lengths between the flow-obstructing devices, such that any residual vibrations of the isolated columns of liquid which occur advantageously have different resonance frequencies.

BRIEF DESCRIPTION OF THE DRAWINGS

A preferred embodiment of the invention is described with reference to the drawings, in which:

FIG. 1 is a schematic side elevation, in longitudinal section of a streamer construction incorporating the present invention; and FIG. 2 is an enlarged side elevation in section through a streamer according to the invention.

DESCRIPTION OF THE PREFERRED EMBODIMENTS

FIG. 1 shows a diagrammatic section of a marine-seismic streamer cable having a skeleton structure 1 consisting of a plurality of hauling cables 3 and shaped pieces 2 which are spaced apart in the longitudinal direction and in which the hauling cables 3 are attached in a suitable manner. The skeleton structure 1 absorbs the tensile and transverse forces acting on the streamer. The skeleton structure 1 is enclosed by a tube 4.

A hydrophone 5 is arranged in each shaped piece in an axial through-bore 6 provided in the shaped piece 2. Electric wires 7 connect the hydrophones 5 to a recording apparatus (not illustrated). The electric wires 7 are passed through a bore in the shaped piece 2.

The shaped pieces 2 have flow-obstructing devices which are illustrated in detail in FIG. 2. The shaped pieces 2 thus divide the streamer into sections 20 which damp a longitudinally directed liquid flow in the tube 4 from one section 20 to an adjacent section 20.

FIG. 2 shows the construction of the flow-obstructing device in detail. A section of the streamer tube is illustrated in which a shaped piece 2 is arranged with flow-obstructing devices. Shaped piece 2 comprises a cylindrical central part 21 with identical head parts 22 attached to the end faces of central part 21. Shaped piece 2 has an axially arranged through-bore 6 of large diameter in which a hydrophone 5 with a sleeve-type seal 11 is inserted. The outside diameter of the cylindrical shaped piece 2 is less than the inside diameter of tube 4, resulting in an annular gap 9 between the shaped piece 2 and tube 4. Situated in annular gap 9 are two annular seals 10 which are arranged axially spaced apart and are clamped in each case between central part 21 and the head part 22 of shaped piece 2 and tube 4. In this case, the head parts 22 are attached to central part 21 by screws. Stud bolts arranged between central part 21 and head parts 22 allow the annular seals 10 to be clamped effectively, but not excessively pressed or compressed, between central part 21 and the head parts. Annular seals 10 have an outside diameter which essentially corresponds to the inside diameter of the tube 4.

Axially parallel bores 12 are provided in the outer region of shaped piece 2 in even circular distribution corresponding to the number of hauling cables 3 used in the streamer. Hauling cables 3 are attached in bores 12 in a suitable manner.

Annular seals 10 and sleeve-type seal 11 consist of open-pore PU-foam. The seals 10 and 11 thus act in a flow-obstructing manner, but allow damped compensation flows of the liquid filling 8.

The flow-obstructing devices thus form a low-pass filter which allows slow flow movement, but damps higher frequency signals and thus damps the signals which interfere with the useful seismic energy.

Filling, emptying or changing liquid filling 8 of the streamer according to the invention continues to be possible. To accelerate these operations, the pressure of the liquid filling can be increased such that tube 4 is distended and forms an enlarged annular gap between annular seal 10 and tube 4 so that the seals are free from the tube.

List of Reference Numerals

1 Skeleton structure
2 Shaped piece
3 Hauling cable
4 Tube
5 Hydrophone
6 Through-bore
7 Electric lead
8 Liquid filling
9 Annular gap
10 Annular seal
11 Sleeve-type seal
12 Bore
20 Section
21 Central part
22 Head parts

What is claimed is:

1. A marine seismic streamer comprising the combination of
an elongated liquid-filled tube (4) having an inner diameter;
a plurality of hauling cables (3) extending longitudinally through said tube;
plurality of longitudinally spaced, partially permeable, flow-obstructing cylindrically shaped support pieces (2) dividing the streamer into sections, each said cylindrically shaped support piece having an outer diameter smaller than the inner diameter of said tube (4) such that an annular gap is formed between said tube and said cylindrically shaped support piece, each said support piece including
two longitudinally spaced, substantially identical head parts (22) joined to each other, and
an annular seal (10) between said head parts and extending radially outwardly from said support piece, said annular seal having an outer diameter corresponding to the inside diameter of the tube (4); and
a hydrophone (5) carried in said shaped support piece.

2. A marine seismic streamer according to claim 1 wherein said cylindrically shaped support piece (2) includes a central part between said two substantially identical head parts (22) and wherein an annular seal (10) is between each end of said central part and one of said two head parts.

3. A marine seismic streamer according to claim 2 wherein each said support piece includes an outer annular groove at each location where a head part is joined to said central part, and wherein said annular seals (10) are mounted in said outer annular grooves.

4. A marine seismic streamer according to claim 1 wherein the cylindrical surface of a shaped piece (2) has linear elevations running in the longitudinal direction of the tube.

5. A marine seismic streamer according to claim 4 wherein each said elevation has a height corresponding to the width of the gap between the shaped piece and the inside wall of the tube.

6. A marine seismic streamer according to claim 1 wherein said cylindrically shaped support piece includes a longitudinally extending throughbore (6) containing said hydrophone (5).

7. A marine seismic streamer according to claim 6 wherein the hydrophone is in a tube section which is in said through-bore and is anchored in a sleeve-type seal.

8. A marine seismic streamer according to claim 7 wherein said seals (10, 11) are formed from open-cell, elastic, material such that through-channels of reduced opening cross-section remain in the longitudinal direction of the streamer.

9. A marine seismic streamer according to claim 1 wherein the modulus of elasticity of said tube (4) is selected to be such that, under tensile force during a measuring run of the streamer, the inside diameter of the tube (4) substantially corresponds to the outer diameter of the shaped pieces (2).

10. A marine seismic streamer according to claim 1 wherein said shaped pieces (2) are formed from an open-cell, solid material, selected from the group including polypropylene or polyamide.

11. A marine seismic streamer according to claim 1 wherein said annular seals (10) are O-rings or lip seals with through-openings, the through-openings allowing damped liquid flow.

12. A marine seismic streamer according to claim 1 wherein each shaped piece (2) of the streamer has hydrophones (5) and flow-obstructing devices.

13. A marine seismic streamer according to claim 1 wherein hydrophones (5) and shaped pieces (2), succeeding one another in a regular or irregular manner are arranged in the streamer.

* * * * *